US008757710B2

(12) United States Patent
Nellen

(10) Patent No.: US 8,757,710 B2
(45) Date of Patent: Jun. 24, 2014

(54) ROOF ASSEMBLY FOR A VEHICLE

(71) Applicant: Inalfa Roof Systems Group B.V., Venray (NL)

(72) Inventor: Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/644,499

(22) Filed: Oct. 4, 2012

(65) Prior Publication Data

US 2013/0088052 A1    Apr. 11, 2013

(30) Foreign Application Priority Data

Oct. 6, 2011    (EP) .................................... 11184056

(51) Int. Cl.
*B60J 3/02*    (2006.01)
*B60J 7/057*    (2006.01)

(52) U.S. Cl.
USPC ........................ 296/214; 296/223; 296/216.08

(58) Field of Classification Search
USPC ..................................... 296/214, 216.01–224
See application file for complete search history.

(56) References Cited

U.S. PATENT DOCUMENTS

2005/0263257 A1    12/2005 Hansen et al.

FOREIGN PATENT DOCUMENTS

| DE | 10143838 | 3/2003 |
|----|----------|--------|
| DE | 10338722 | 3/2005 |
| DE | 102004020531 | 9/2005 |
| DE | 102005013643 | 9/2006 |
| EP | 1291217 | 3/2003 |

OTHER PUBLICATIONS

European Search Report of the Munich Patent Office in counterpart foreign application No. 11184056.7 filed Oct. 6, 2011.

*Primary Examiner* — Dennis H Pedder
(74) *Attorney, Agent, or Firm* — Steven M. Koehler; Westman, Champlin & Koehler, P.A.

(57) ABSTRACT

A roof assembly for a vehicle roof opening comprises a pair of guide rails extending in a non-parallel way and at a distance from each other. At least one closure element is adjustable in order to at least cover and at least partly open the opening. At least one pair of sliding elements opposite of each other on each of opposite sides of the closure element is provided for slidably engaging in the respective guide rail. The sliding elements are slidably connected to the closure element in a substantially lateral direction. A biasing device is used for biasing the sliding elements relative to the closure element in a substantially lateral direction by being attached to the closure element on one end and being operatively connected to each pair of opposite sliding elements on the other end with interposition of a synchronizing device equalizing the movements of the sliding elements.

17 Claims, 11 Drawing Sheets

ROOF ASSEMBLY FOR A VEHICLE

BACKGROUND

The discussion below is merely provided for general background information and is not intended to be used as an aid in determining the scope of the claimed subject matter.

Aspects of the invention relate to a roof assembly for a vehicle having a passage opening in its roof. The roof assembly includes a pair of guide rails extending in a non-parallel way and at a distance from each other. At least one closure element is adjustable in order to at least cover and at least partly open the passage opening in said vehicle roof. The closure element has two opposite sides adjacent to the guide rails. At least one pair of sliding elements opposite of each other on each of said sides of the closure element slidably engages the guide groove in the respective guide rail. The sliding elements are slidably connected to the closure element in a substantially lateral direction. A biasing device biases the sliding elements relative to the closure element in a substantially lateral direction.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention is a roof assembly in which the biasing device is attached to the closure element on one end and is operatively connected to each pair of opposite sliding elements on the other end with interposition of a synchronizing device equalizing the movements of the sliding elements.

By having the biasing device attached to the closure element, it can be positioned in a favorable position, for example in view of the packaging height. By operatively connecting the biasing device to the sliding elements through a synchronizing device, the closure element will be maintained in a predetermined lateral position while preventing rattling at the same time.

In one embodiment, the biasing device comprises a contracting spring, and the synchronizing device includes pull elements biased by the contracting spring.

By using elements which are only loaded by tension or pulling forces, these elements can generally be made simpler and more compact than elements that should also withstand push forces.

For example, the spring may be a linear pull spring, such as a helical spring, although it may also be designed as a torsion spring. These are simple, low cost and compact types of springs.

In a particular embodiment, the synchronizing device comprises at least one pulley, attached to the closure panel in a rotatable manner and having two flexible pull elements connected to the sliding elements and of which at least one is wound around the pulley. The flexible pulling element is a cord, cable or the like. All these elements may have a very small package height.

In a further embodiment, one of the flexible pull elements is attached on one end to one of the sliding elements and on the other end to the pull spring, while the other of the flexible pull elements is connected on one end to either the pulley or the spring and on the other end to the other of the sliding elements, one of the pulling elements being guided around the pulley.

The closure element may be provided with at least two pairs of sliding elements, and at least one pair of sliding elements is provided with the biasing and synchronizing devices. Depending on the shape of the guide rails, both pairs of sliding elements or only one pair should be able to move in a lateral direction to the guide rails. Of course, the closure element may comprise more pairs of sliding elements which may or may not be provided with biasing and/or synchronizing devices.

In a particular embodiment, the closure element is a sunshade including a flexible cloth which is attached to a winding shaft on one end and to an operating beam on the other end, the sliding elements, and biasing and synchronizing devices being associated with the operating beam. In this embodiment, it may be sufficient to have one pair of sliding elements because one end of the closure element is fixed with respect to the guide rails. In such embodiment, it is convenient to arrange the biasing and synchronizing devices within the operating beam, which leads to a very compact arrangement.

In another embodiment, the closure element is a sunshade including a main part and two secondary parts which are movable with respect to the main part and which are provided with the sliding elements, the biasing and synchronizing devices being attached to the main part of the closure element.

In a further embodiment, the closure element is a rigid closure panel closing the passage opening in the roof, the closure panel having in each guide rail an operating mechanism including supports and the sliding elements, the opposite supports mechanisms being connected to each other through the biasing and synchronizing devices.

BRIEF DESCRIPTION OF THE DRAWINGS

Aspects of the invention will hereafter be elucidated with reference to the drawings showing embodiments of the invention by way of example.

DETAILED DESCRIPTION OF THE ILLUSTRATIVE EMBODIMENTS

Figure 1:
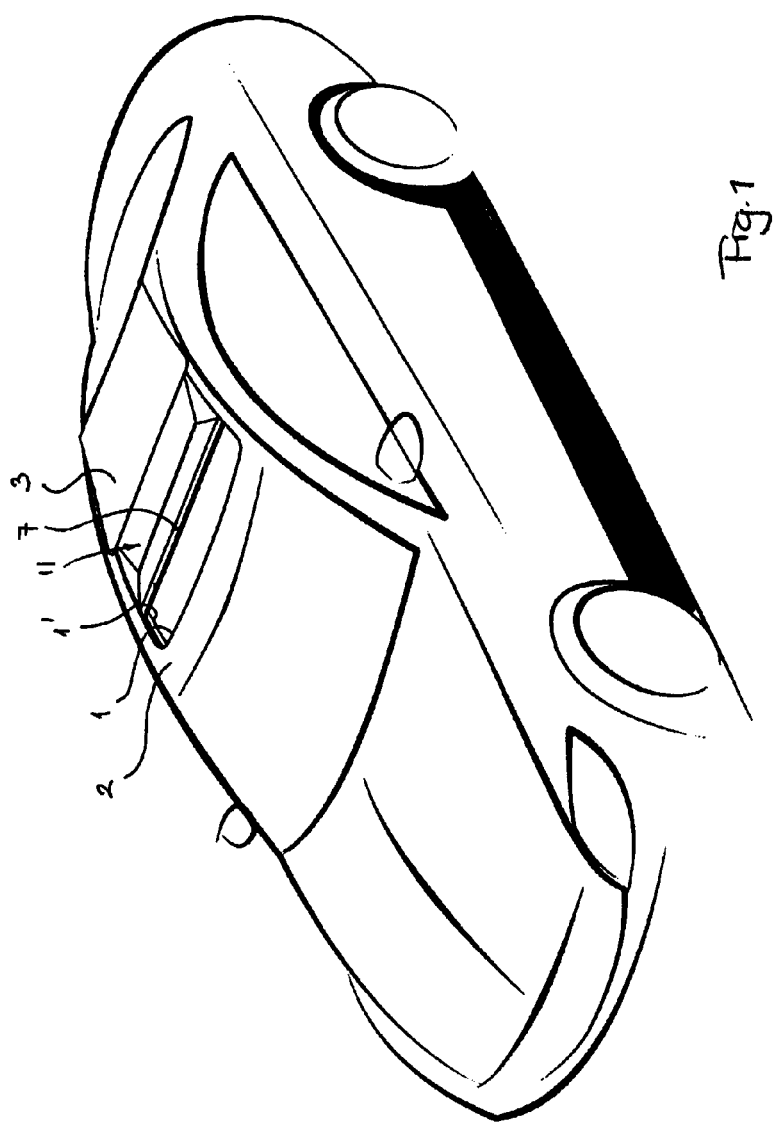
FIG. 1 is a schematic perspective view of a passenger car which is provided with an embodiment of the roof assembly.

Referring to FIG. 1, a vehicle having a roof assembly in its roof is illustrated schematically. Said roof assembly comprises a roof opening 1 in a stationary roof part 2 of the vehicle, such as a passenger car, and a movable closure element, for example a panel 3 which, by means not illustrated but known per se, can be moved for closing and at least partly opening said roof opening 1.

Below the roof opening 1 a further closure element 11, here in the form of a sunshade assembly is arranged. This further closure element is intended to close and at least partly open a passage opening 1' in the stationary part (frame) of the roof assembly which is below the roof opening 1. Both the panel 3 and the sunshade assembly 11 will cover the roof opening 1 and the passage opening 1' when in the closed position.

Figure 2:
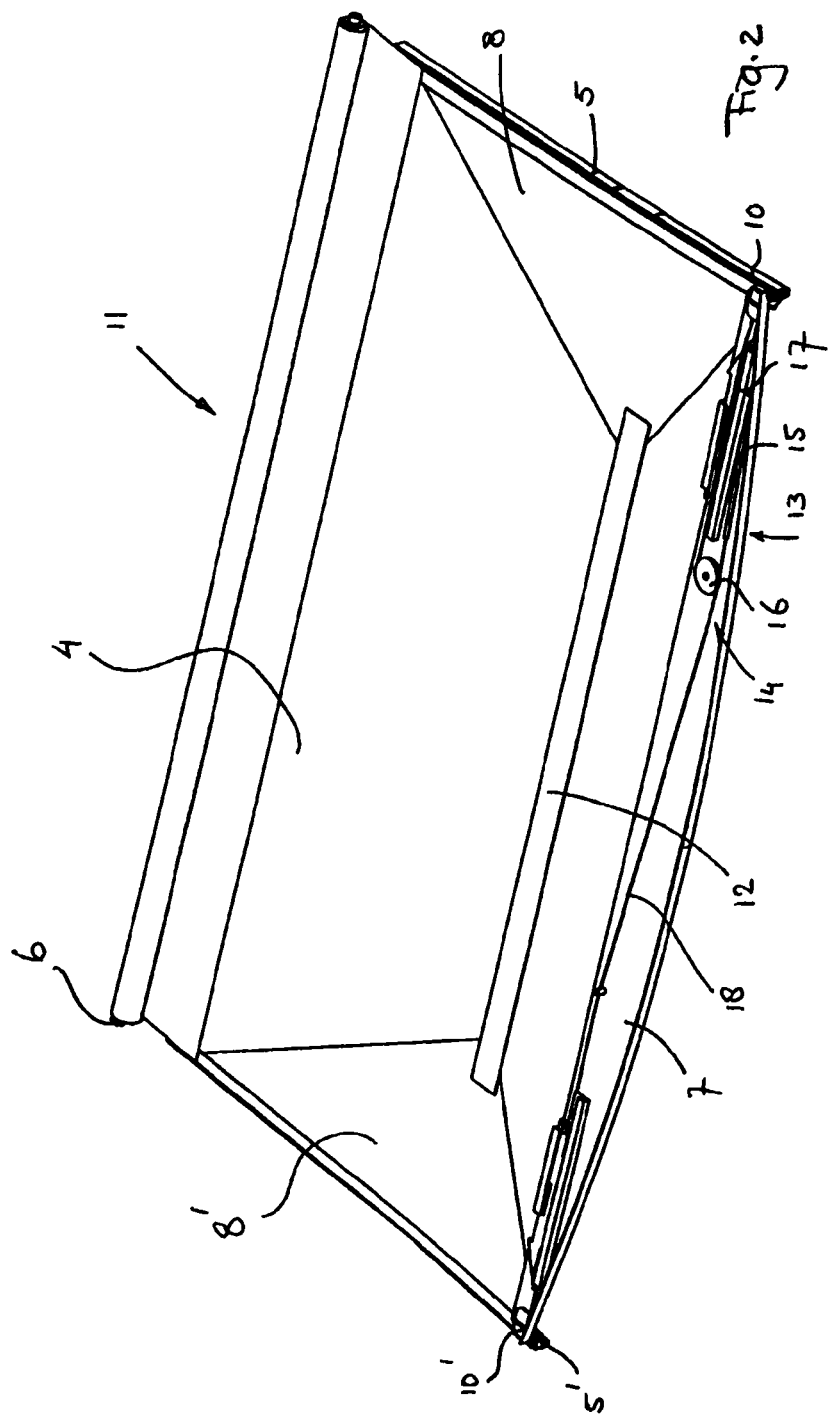
FIG. 2 is a perspective view of the roof assembly as used in the car of FIG. 1.

Referring to FIG. 2, the sunshade assembly is configured as a so called "rollo" or roller screen which comprises a flexible screen or cloth 4 having opposed longitudinal edges (extending mainly in a longitudinal direction of the vehicle) and opposed transversal edges, the longitudinal edges extend adjacent to and being guided in non parallel guide rails 5, 5'. Said guide rails 5, 5' may be straight or may have a curvature individually, but are aligned towards each other in such a way that they are slightly diverging from each other, in this case towards the front of the roof opening 1.

Figure 3:
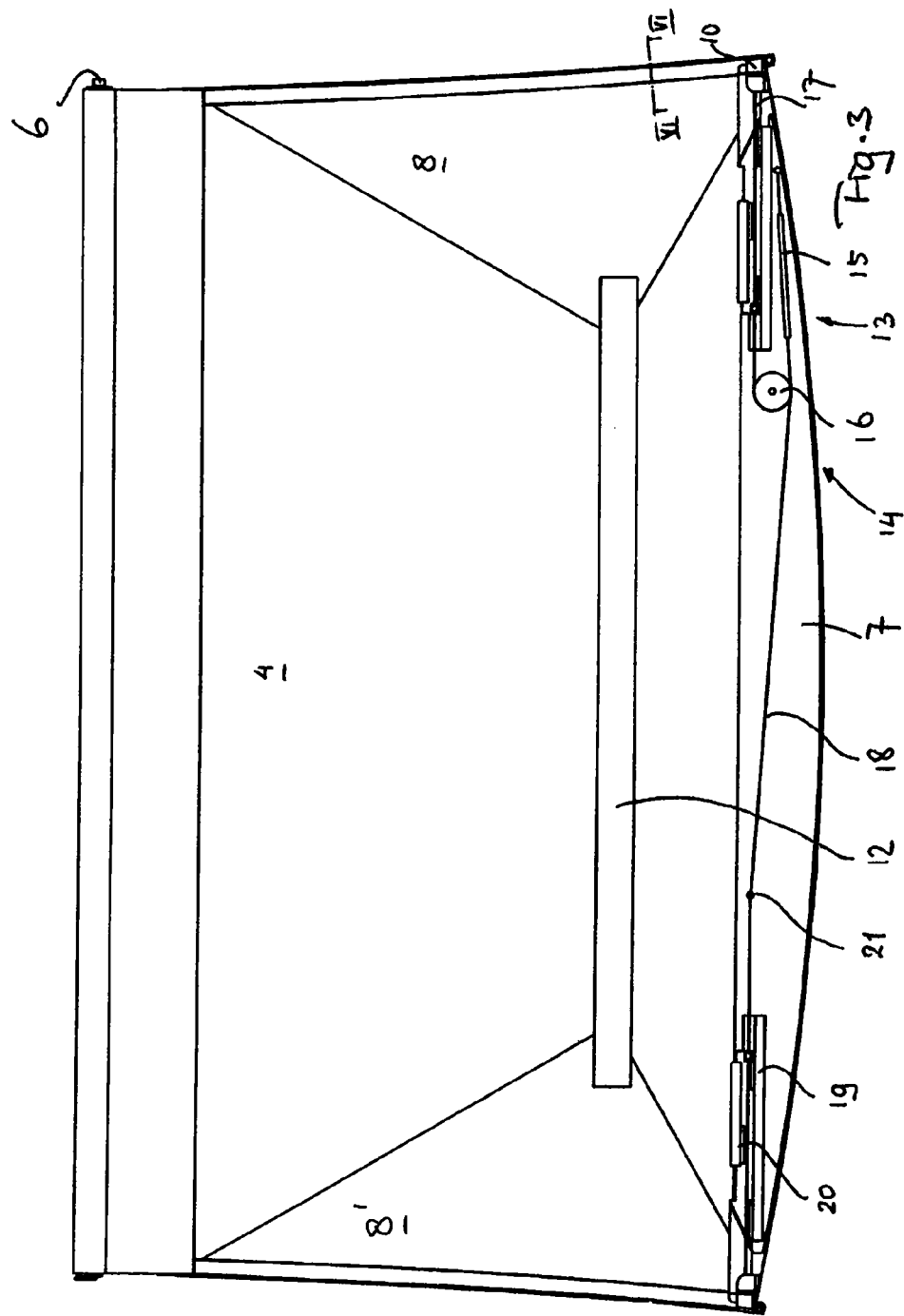
FIG. 3 is a slightly larger plan view of the roof assembly of FIG. 2.
Figure 6:
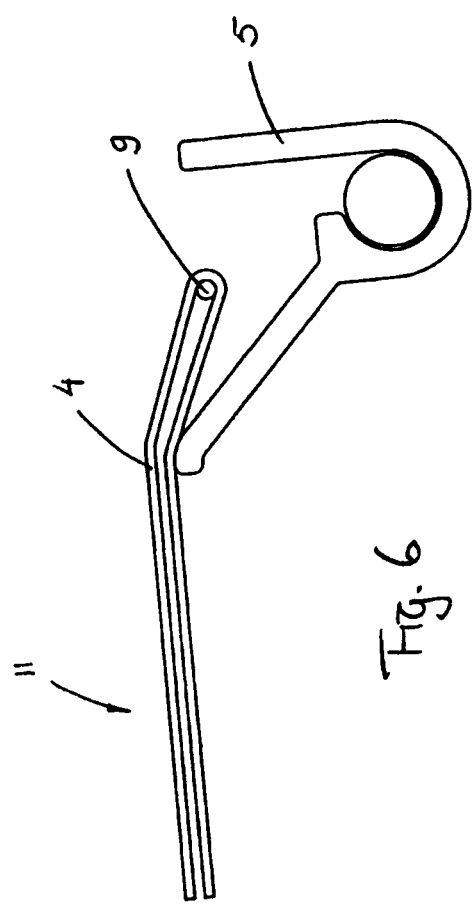
FIG. 6 is an enlarged sectional view according to the line VI-VI in FIG. 3.

A first one of the transversal edges of the flexible screen 4 is connected to a rotatable winding shaft 6 configured for winding and unwinding said sunscreen, a second transversal edge being connected to an operating beam 7 for tensioning and unwinding said sunscreen in the longitudinal direction. Said winding shaft 6 is known per se, and is therefore not further elucidated. In FIGS. 2 and 3, the sunshade assembly is shown in a rolled out or unwound condition in which it closes the passage below the roof opening 1. The screen is connected to the beam 7, in a way known per se, and is not further elucidated. Each end of the beam 7 has a joint with a sliding element 10, 10'. Said joint adapts to the changing distance between the non parallel guide rails 5, 5' and one end of the beam 7, 7' when the sunshade assembly is unwound, or wound. The changing distance between the non parallel guides 5, 5' is taken up by the screen 4 through lateral screen parts 8, 8', said parts moving in a lateral direction and moving around a folding member 9 comprising at least part of a cloth stretching system (see FIG. 6), and further in a lateral direction towards the opposite guide rails 5,5' when the screen is wound or unwound.

As mentioned, the sunshade assembly further comprises opposed lateral screen parts 8, 8' biased in the lateral direction. Said lateral screen parts 8, 8' may be made of the same material, and made integral with a center part of the flexible screen 4 from a single piece of material, if desired. On the other hand, the lateral screen parts 8, 8' may be made of a different material compared to that of the center part of the flexible screen 4. It is also conceivable that the lateral screen parts 8, 8' are made of elastic material(s), and be connected with the center part of the flexible screen 4 by stitching, gluing, welding or any other suitable way known per se.

Referring to FIG. 2, 3, portions of said lateral screen parts 8, 8' are folded around the folding member 9, are arranged vertically above the screen 4 and are directed in a direction substantially towards the opposing folding member 9. It is clear that in an embodiment where the folding member 9 is a wire or other flat member, as is the case in the FIG. 6 embodiment, the portion of the folded lateral screen parts 8, 8' pointing in the direction towards the opposite guide rail 5 on the other side of the opening 1 may lie substantially on top of and substantially in contact with the upper side of the screen 4. The lateral screen parts 8, 8' may be of a substantially triangular shape, however any other shape, for instance rectangular, or circular shapes are possible too. The folded lateral screen parts 8, 8' may thus be folded around the folding member 9 in an angle of substantially 180°, however an angle slightly smaller or bigger is possible too. In general an angle in a range between 160° and 200° would be sufficient. In order to reduce the friction between the lateral screen parts 8, 8' and the folding member or wire 9 and to facilitate the lateral movement of the lateral screen part 8, 8' around a substantial portion of the wire 9 and along a substantial length of the longitudinal edge of the sunscreen 4, it is conceivable to have a flexible sleeve around the folding member 9, especially in case the folding member is a wire 9 or a bending stiff rod (not shown). Such a sleeve avoids the risk of having excessive wear or other damage such as at the inside of the lateral screen parts 8, 8'.

The lateral screen parts 8, 8' are biased in lateral direction towards the opposite guide rail 5, 5'. The biasing force originates from an elastic member 12, which may be an elastic band or equivalent that also forms an optional part of the cloth stretching system. It is important however that the elastic member 12 has enough biasing force in the lateral direction to keep the screen and its lateral screen parts 8, 8' taut across the width of opening 1. The elastic member 12 needs to be flexible to such extent that it is able to be rolled up together with the screen onto the winding shaft 6, without leaving marks on the neighboring screen material, when the rollo is unwound again.

The elastic member 12 may be connecting the two opposite lateral screen parts 8, 8', however it is also conceivable that the elastic member 12 connects each of the lateral screen parts 8, 8' with the beam 7,7' or connecting the lateral screen parts 8, 8' with the upper side of the screen 4. The wire 9 will generally be wound together with the screen 4, for example on a reel arranged on the winding shaft. One end of the wire 9 will therefore be attached to the reel, the other end will be attached to the sliding element 10, 10' or to a biasing device to be described below. It will be kept taut between its ends so as to be able to withstand the tensioning force of the elastic member 12.

As mentioned above, the roof assembly, and in particular the closure element is provided with a biasing device 13 and a synchronizing device 14, which in this case extend between the opposite sliding elements 10, 10' at the position of the operating beam 7. The synchronizing device 14 acts upon the sliding elements 10, 10' to ensure that when the sliding elements 10, 10' move in lateral direction to follow the curvature of the guide rails 5, 5' they move equal distances so that the operating beam 7 and the screen 4 attached to it remain in the same lateral position, i.e. symmetrically between the guide rails 5, 5'. The biasing device 13 ensures that the sliding elements 10, 10' are biased against the guide rails 5, 5' and in this embodiment also that the synchronizing device 14 is kept taut and is always loaded by a pulling force.

The biasing device 13 in this embodiment comprises a linear pull spring, such as a helical spring 15 which is attached to the beam 7 (and thus to the closure element 11) on one end and is operatively connected to the sliding elements 10, 10' on the other end through the synchronizing device 14. The synchronizing device 14 includes a pulley 16 around which a first flexible pulling element 17, such as a cord or cable, is guided, which is attached to the spring 15 on one end and to the sliding element 10 on the other end. Furthermore, there is a second pulling element 18 which is attacked to the sliding element 10' on one end and which might be guided around the pulley 16 and is attached thereto on the other end. However, in this case the pulling element 18 is attached directly to the spring 15, so that both pulling elements 17,18 are attached to the spring 15 and are then guided into opposite directions so that if one sliding element 10,10' is displaced in lateral direction, it influences and therefore displaces the movable end of the spring 15. As a result thereof, both pulling elements 17, 18 move and, due to the pulling element 17 being guided 180° around the pulley 16, both sliding elements 10, 10' move an equal distance in opposite directions.

Figure 4:
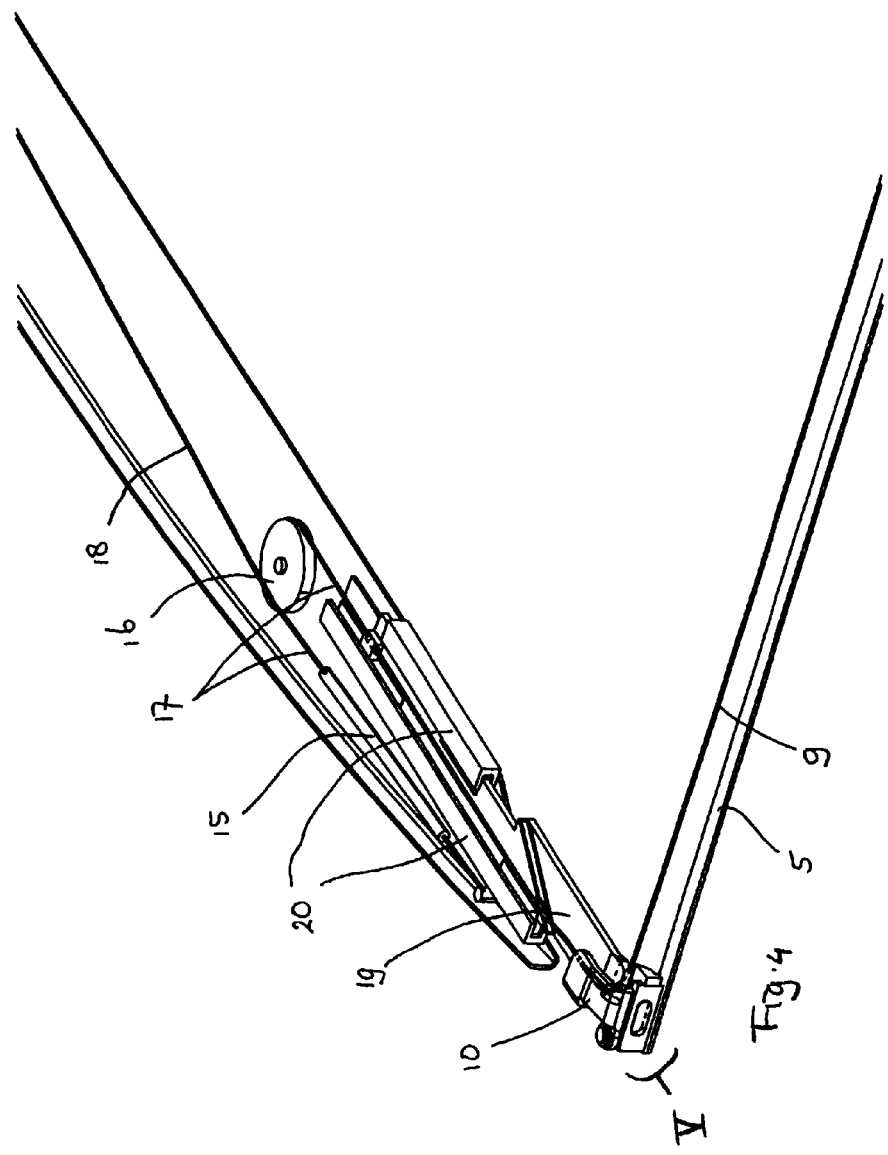
FIG. 4 is an enlarged perspective view of a part of the closure element of FIG. 2, turned 90° around a vertical axis, and shown without a cloth.

In this particular embodiment, the sliding elements 10, 10' are attached on, elongated, supports 19 (FIGS. 2-4) extending in lateral direction and being guided by guides 20 on the beam 7 so as to be able to move in the lateral direction of the roof assembly. The pulling element 18 is guided along a guide 21 to bring portions of pulling elements 17, 18 connected closest to sliding elements 10,10' in line with each other and with the sliding elements 10, 10'.

Figure 5:
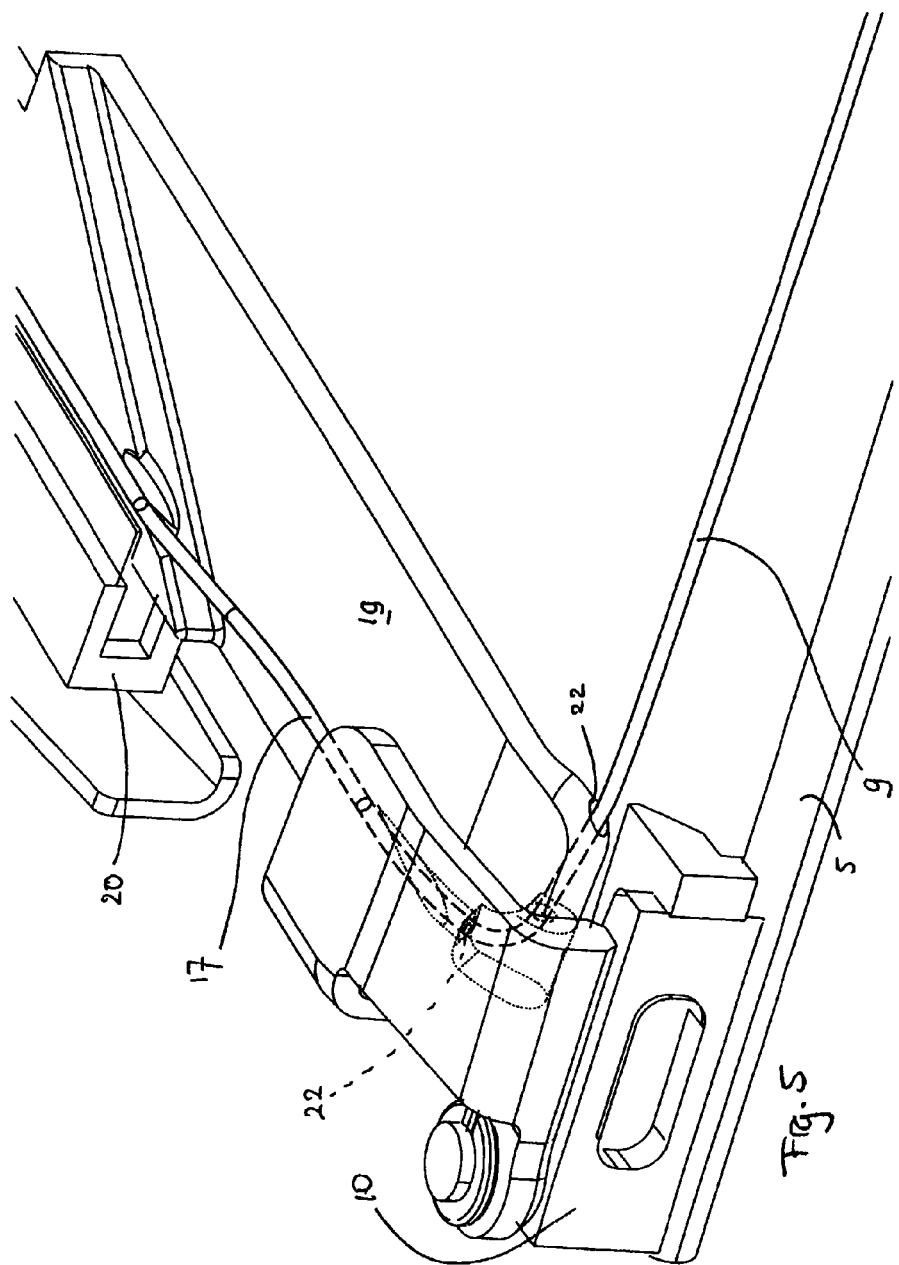
FIG. 5 shows detail V in FIG. 4 on a larger scale.

As is particularly shown in FIG. 5, the pulling element 17 is not attached to the sliding element 10 but is guided through a guide channel 22 which guides the pulling element 17 through substantially 90° so as to be able to connect to the folding member or wire 9. Of course, the pulling element 17 and the folding member 9 may be a continuous integral member if desired formed from a single type of wire. The same is true for the pulling element 18 and the wire 9 on the opposite side. In this way, the functions of the folding member 9 and the biasing/synchronizing device are performed by one device (e.g. one wire) comprising two pulling elements, 17,18. If the biasing device 13 has a different structure, the folding member 9 for stretching the cloth might still be coupled to the biasing device 13.

Figure 7:
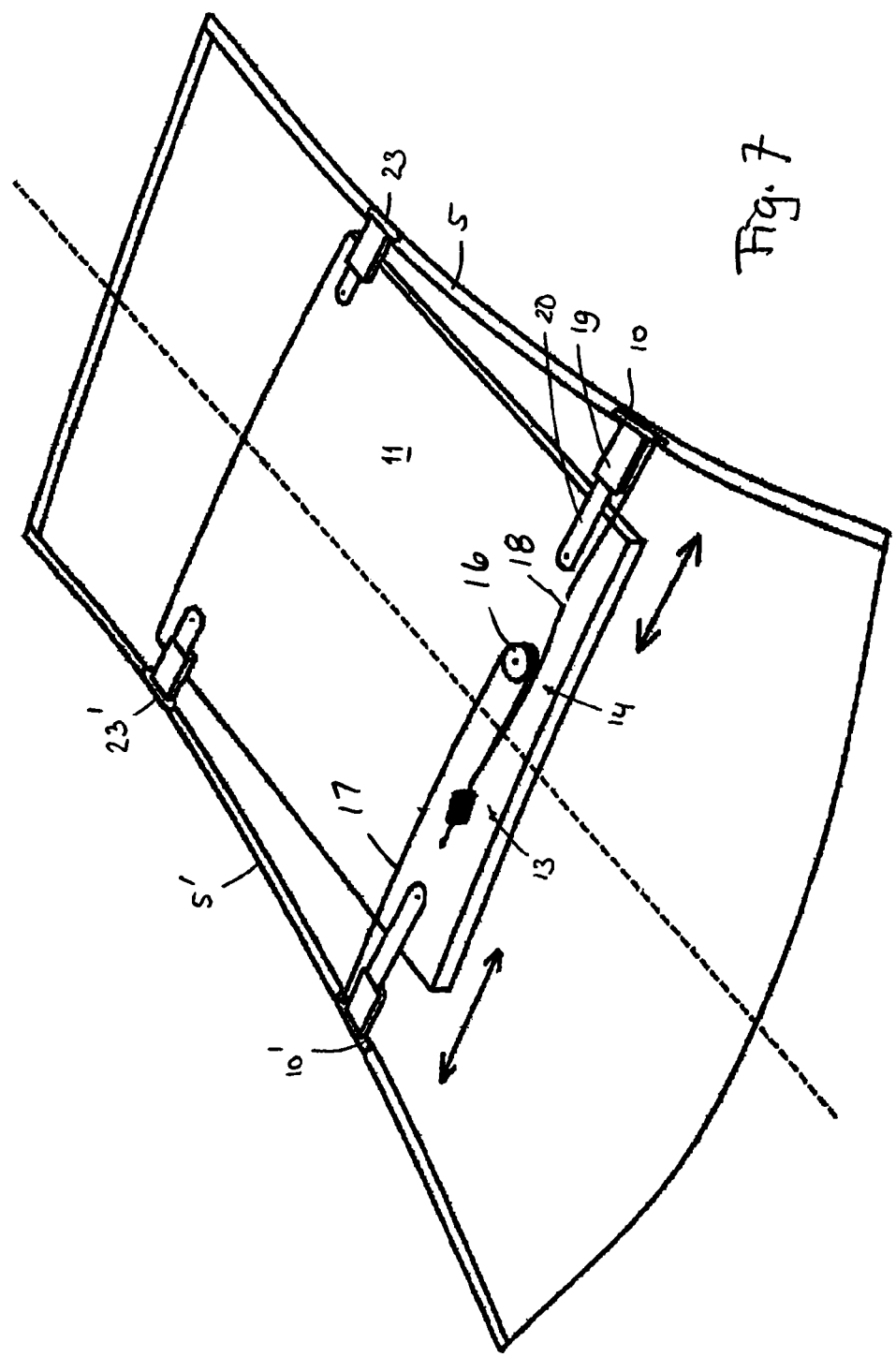
FIG. 7 is a schematic perspective view of another embodiment of the roof assembly.

FIG. 7 shows another embodiment of the roof assembly. In this embodiment, the closure element 11 is a rigid panel which is slidably guided along two guide rails 5, 5' by means of two pairs of sliding elements 10, 10' and 23, 23'. Depending on the extent of the guide rails 5, 5' and the length of the path of the closure element 11, both or just one pair of sliding elements 10, 10' and 23, 23' should be able to follow the curvature of the guide rails and is provided with a biasing and synchronizing device 13, 14. The structure of the biasing and synchronizing devices 13, 14 may be similar to that of the first embodiment.

Figure 8:
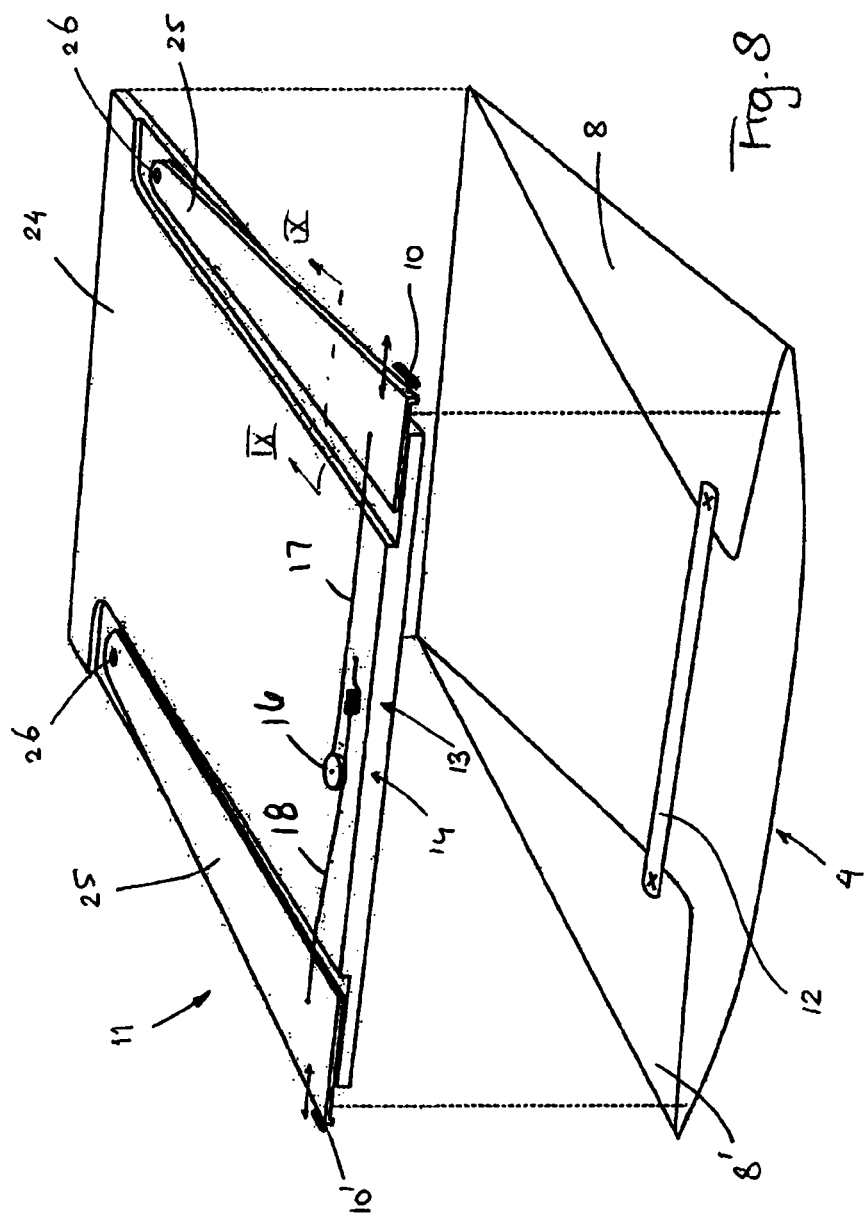
FIG. 8 is a schematic, partly exploded, perspective view of a closure element of another embodiment of the roof assembly.
Figure 9:
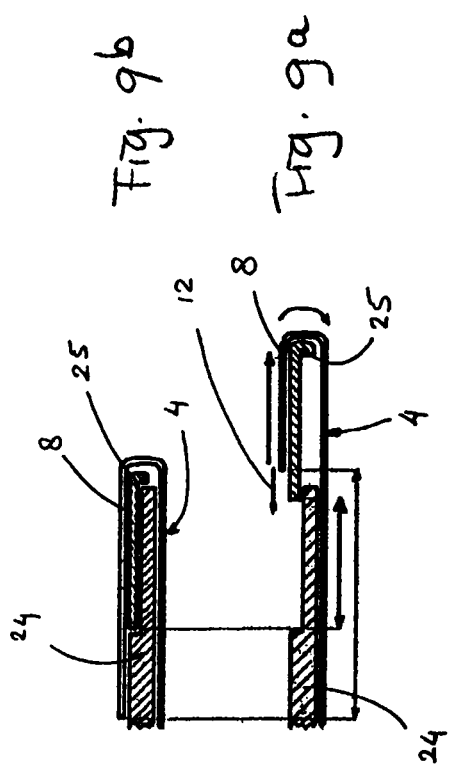
FIGS. 9a and 9b are enlarged sectional views according to the line IX-IX in FIG. 8, in two different positions and with the cloth of the closure element in the position of use.

FIG. 8 shows still another embodiment of the roof assembly, in which the biasing and synchronizing devices 13, 14 are used on a closure element 11 in the form of a sunshade including a main part 24 and two secondary parts 25 which are movable with respect to the main part 24 and which are provided with the sliding elements 10, 10'. Here the secondary parts 25 are pivotally attached to the main part 24 so that the secondary parts 25 can pivot around corresponding axes 26 extending perpendicularly to the main part 24, i.e. substantially vertical. The biasing device 13 is attached to the main part 24 of the closure element 11 and ends of the pulling elements 17, 18 opposite to the biasing device 13 are attached to the respective secondary parts 25. The secondary parts 25 are used to tension the cloth or screen 4 which is wrapped around the rigid panel and is formed like in the first embodiment of FIGS. 2, 3. FIGS. 9*a*, 9*b* show how the secondary parts 25 can move with respect to the main part 24 and how the screen 4 will move around the closure element 11.

Figure 10:
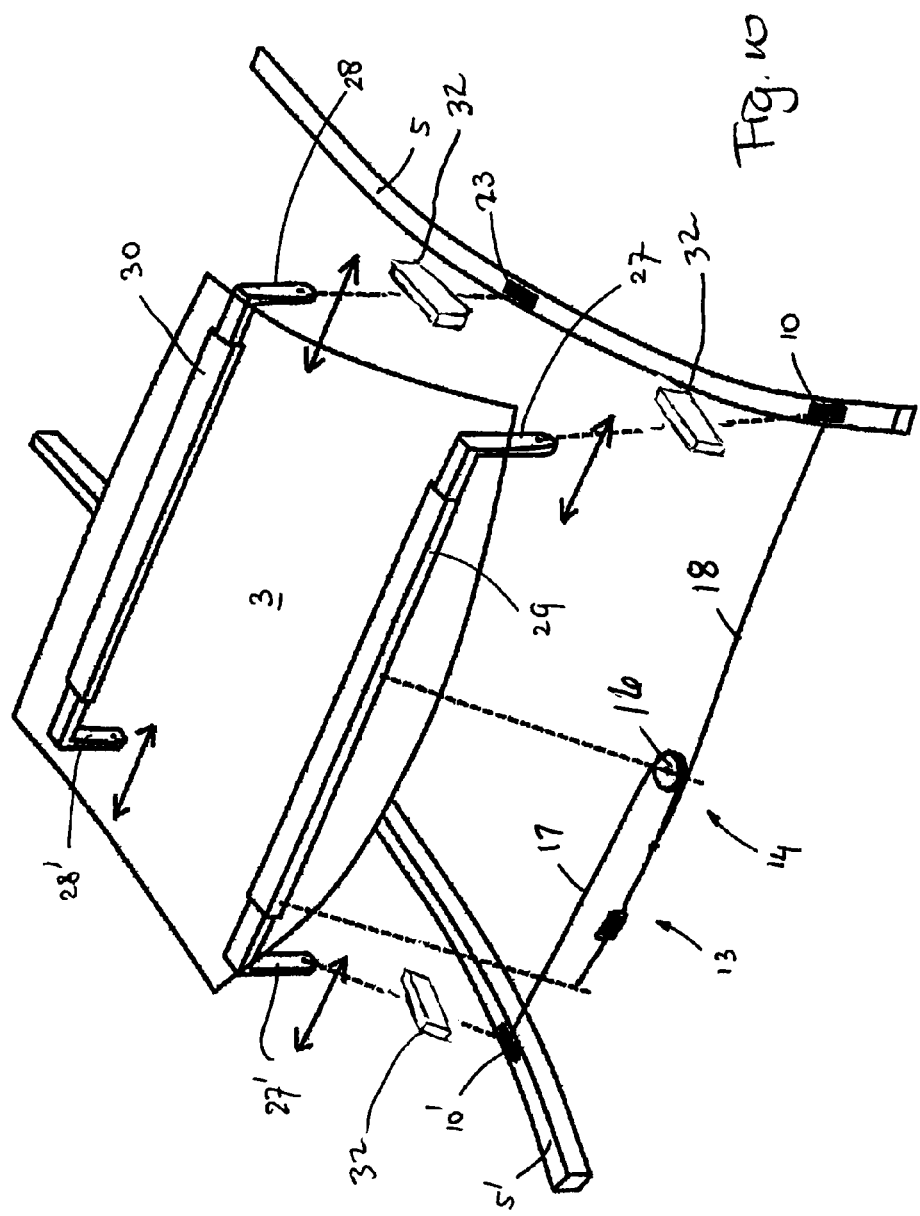
FIG. 10 is a very schematic, partly exploded perspective view of still a further embodiment of the roof assembly.

FIG. 10 is still another embodiment in which the closure element is the upper rigid glass panel 3 that is able to close and at least partly open the external roof opening 1 in the vehicle roof. This panel 3 is supported on the guide rails 5, 5' through an operating mechanism 32 (schematically illustrated) that is adapted to move the closure element 3 both in horizontal and vertical direction.

In the very schematic drawing, the closure element 3 is provided with the front and rear supports 27, 27' and 28, 28' that are coupled to or connected to the operating mechanisms 32, or to the sliding elements 10, 10' and 23, 23' directly. It should be noted for purposes of understanding aspects of the invention, the operating mechanism 32, and particularly, linkage between the front and rear supports 27, 27' and 28, 28' (which can be considered part of the operating mechanism 32) and the sliding elements 10, 10' and 23, 23' that causes movement of the panel 3 (e.g. tilting, raising and/or lowering of the panel 3 to extend at least partially above or below a fixed roof) is not important. The operating mechanisms 32 are therefore illustrated herein schematically and represent lever (s), pin(s), guide(s) for the pin(s), etc. that move with the sliding elements 10, 10' and 23, 23' or have components that are stationary alongside the guide rails 5,5'. As known by those skilled in the art, such lever(s), pin(s), guide(s), etc. in operating mechanisms 32 are well known and are configured as necessary to move the panel 4 as desired.

The supports 27, 27' and 28, 28' are movable with respect to the closure element 3 in the lateral direction to adapt to the mutual distance between the guide rails 5, 5', which varies along the length or portion of the length thereof. At least one pair of supports/sliding elements 27, 27', 28, 28'/10, 10', 23, 23' are provided with and interconnected by a biasing/synchronizing device 13, 14 to ensure that the closure element 3 remains centrally between the guide rails 5, 5'. If the supports 27,27',28,28' are guided with respect to the closure panel 3 by means of a guide beam 29, 30 extending in lateral direction of the closure element 3, the biasing/synchronizing device 13, 14 can be accommodated in or mounted to beam 29 and/or 30 as well. The dashed lines in the exploded view of FIG. 10 represent location at least partly in the beam 29 (e.g. mounted from below) or otherwise being connected thereto.

Figure 11:
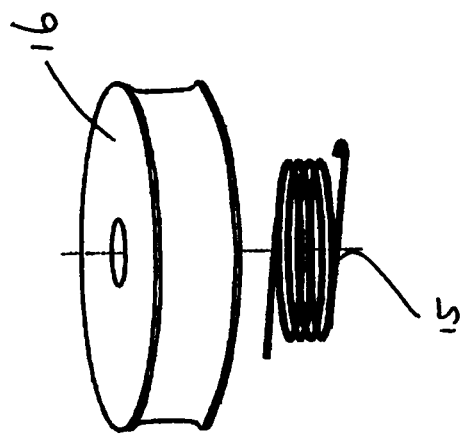
FIG. 11 is an exploded view of a pulley of one of the embodiments of the roof assembly having a different type of biasing spring.

FIG. 11 shows a variation of the contracting spring 15 for the biasing device 13. In this variation, the spring 15 is a torsion spring which may be accommodated at least partly in the pulley 16, or otherwise operably connected to pulley 16 to bias the rotation thereof. In the exemplary embodiment, the spring 15 engages the closure element 3, 11 at one of its ends and engages the pulley 16 or pulley shaft at its other end to exert a rotational bias force on the pulley 16 and thereby on the flexible pulling elements 17, 18 which are both wound around it and attached to it, such that again the sliding elements attached to the pulling elements are 17,18 synchronized and move equal distances in opposite direction. Of course, also when a helical spring or another type of pulling or pushing spring is used, it might engage the pulley 16 to exert a rotational force on it, while the pulling elements are 17,18 both wound around the pulley 16.

From the foregoing it will be clear that the invention provides a roof assembly which has a simple, low cost solution for guiding closure elements along non-parallel guides in a stable manner and with a small package height.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A roof assembly for a vehicle having a roof opening in its roof, comprising:
   a pair of guide rails extending at least in part in a non-parallel generally longitudinal way and at a distance from each other;
   at least one closure element , being adjustable in order to at least cover and at least partly open the opening in said vehicle roof, said closure element having two opposite sides adjacent to the guide rails;

at least one pair of sliding elements opposite of each other disposed on each of said sides of the closure element so as to engage in the respective guide rail, said sliding elements being slidably connected to the closure element in a substantially lateral direction generally orthogonal to the longitudinal direction; and a biasing device comprising a spring coupled to the sliding elements and configured so as to bias the sliding elements relative to the closure element each in a substantially lateral direction, wherein the biasing device is attached to the closure element on one end and is operatively connected to said at least one pair of opposite sliding elements on the other end with interposition of a synchronizing device comprising pull elements operatively biased by the spring, the pull elements connected to and configured to equalize the movements of the sliding elements.

2. The roof assembly according to claim 1, wherein the spring is a linear pull spring.

3. The roof assembly according to claim 1, wherein the spring is a torsion spring.

4. The roof assembly according to claim 1, wherein the synchronizing device comprises at least one pulley, attached to the closure element in a rotatable manner, the pulling elements being flexible and connected to the sliding elements with at least one pulling element wound around the pulley.

5. The roof assembly according to claim 1, wherein each pulling element comprises an elongated flexible member.

6. The roof assembly according to claim 4, wherein the flexible pulling elements are attached on one end to either one of the sliding elements and on the other end is connected to the spring.

7. The roof assembly according to claim 1, wherein the closure element is provided with at least two pairs of sliding elements, and at least one pair of sliding elements is operably coupled to the biasing and synchronizing devices.

8. The roof assembly according to claim 1, wherein the closure element is a sunshade assembly including a flexible cloth which is attached to a winding shaft on one end and to a operating beam on the opposite end, the sliding elements, and the biasing and synchronizing devices being coupled to the operating beam.

9. The roof assembly according to claim 8, wherein the biasing and synchronizing devices are arranged at least partly within the operating beam.

10. The roof assembly according to claim 1, wherein the closure element is a sunshade including a main part and two secondary parts which are movable with respect to the main part and which are provided with the sliding elements, the biasing and synchronizing devices being attached in part to the main part of the closure element.

11. The roof assembly according to claim 1, wherein the closure element is a rigid closure panel closing the roof opening in the roof, the closure panel having in each guide rail an operating mechanism including supports and the sliding elements, the opposite supports being connected to each other through the biasing and synchronizing devices.

12. The roof assembly according to claim 8, wherein the cloth is provided with a cloth stretching system configured to stretch the cloth the in lateral direction.

13. The roof assembly according to claim 12, wherein one of the pulling members is configured with the spring to be kept taut between ends of said one of the pulling members so as to be able to withstand the tensioning force of the cloth stretching system.

14. The roof assembly according to claim 4, wherein the flexible pulling elements are attached on one end to either one of the sliding elements and on the other end is biased by the spring, both pulling elements being guided by the pulley.

15. The roof assembly according to claim 14, wherein both pulling elements are attached to the pulley.

16. The roof assembly according to claim 15, wherein the spring engages the pulley.

17. The roof assembly according to claim 6, wherein one of the pulling elements is connected directly from the sliding element to the spring, while the other pulling element is connected directly to the spring and guided by the pulley to pull in a direction opposite to said one of the pulling elements.

* * * * *